US008527518B2

(12) United States Patent
Transier et al.

(10) Patent No.: US 8,527,518 B2
(45) Date of Patent: Sep. 3, 2013

(54) INVERTED INDEXES WITH MULTIPLE LANGUAGE SUPPORT

(75) Inventors: Frederik Transier, Heidelberg (DE); Holger Schwedes, Kraichtal (DE); Wolfgang Stephan, Heidelberg (DE); Thomas Peh, Heidelberg (DE)

(73) Assignee: SAP AG, Walldorf (DE)

( * ) Notice: Subject to any disclaimer, the term of this patent is extended or adjusted under 35 U.S.C. 154(b) by 248 days.

(21) Appl. No.: 12/970,766

(22) Filed: Dec. 16, 2010

(65) Prior Publication Data

US 2012/0158718 A1    Jun. 21, 2012

(51) Int. Cl.
*G06F 17/30* (2006.01)

(52) U.S. Cl.
USPC ........... 707/741; 707/600; 707/740; 707/706; 704/7; 704/8; 704/9

(58) Field of Classification Search
USPC .......................... 707/741, 740, 706; 704/7–9
See application file for complete search history.

(56) References Cited

U.S. PATENT DOCUMENTS

| | | | |
|---|---|---|---|
| 5,715,195 A | 2/1998 | Smayling et al. | |
| 6,131,082 A | 10/2000 | Hargrave, III et al. | |
| 6,389,387 B1 * | 5/2002 | Poznanski et al. | 704/9 |
| 6,482,011 B1 * | 11/2002 | Lee et al. | 434/157 |
| 6,532,492 B1 | 3/2003 | Presler-Marshall | |
| 6,901,361 B1 * | 5/2005 | Portilla | 704/8 |
| 6,952,691 B2 * | 10/2005 | Drissi et al. | 1/1 |
| 7,039,625 B2 * | 5/2006 | Kim et al. | 707/706 |
| 7,260,570 B2 * | 8/2007 | Brown et al. | 1/1 |
| 8,135,580 B1 * | 3/2012 | Jin et al. | 704/9 |
| 8,171,029 B2 * | 5/2012 | Marvit et al. | 707/740 |
| 2003/0149687 A1 | 8/2003 | Brown et al. | |
| 2004/0103075 A1 * | 5/2004 | Kim et al. | 707/1 |
| 2005/0177554 A1 | 8/2005 | Peltonen et al. | |
| 2008/0126335 A1 | 5/2008 | Gandhi et al. | |
| 2009/0089256 A1 | 4/2009 | Transier et al. | |
| 2009/0094262 A1 * | 4/2009 | Marvit et al. | 707/100 |
| 2012/0109970 A1 * | 5/2012 | Hornkvist et al. | 707/742 |

OTHER PUBLICATIONS

U.S. Appl. No. 12/970,780, Frederik Transier, et al.

* cited by examiner

*Primary Examiner* — Frantz Coby
(74) *Attorney, Agent, or Firm* — Mintz Levin Cohn Ferris Glovsky and Popeo, P.C.

(57) ABSTRACT

A search query for a collection of electronic documents is parsed to identify one or more terms and such identified terms are associated with one or more languages (i.e., spoken languages such as English, German, Spanish, etc.). A terms inverted index and a language inverted index are accessed to identify documents responsive to the query. Related apparatus, systems, techniques and articles are also described.

31 Claims, 2 Drawing Sheets

INVERTED INDEXES WITH MULTIPLE LANGUAGE SUPPORT

TECHNICAL FIELD

The subject matter described herein relates to techniques, systems, and articles for searching documents using queries having terms in multiple languages.

BACKGROUND

Inverted indexes of text search engines and databases have to handle textual content of different languages. Conventional arrangements provide a separate inverted index for each language. However, in most cases, a very small set of languages dominate the indexed text collection. In addition, users often search language-independently, that is, users will often perform a search including terms in two or more languages.

SUMMARY

In one aspect, a search query of a collection of electronic documents is parsed to identify one or more terms. Thereafter, the identified one or more terms are associated with one or more languages. At least one terms inverted list corresponding to at least one identified term is retrieved from a terms positional inverted index. The terms positional inverted index comprises a first plurality of inverted lists mapping terms and associated document positions to documents within the collection of electronic documents. At least one language inverted list corresponding to each associated language is retrieving, from a language inverted index. The language index comprises a second plurality of inverted lists mapping languages to documents within the collection of electronic documents. The language inverted index is separate and distinct from the terms positional inverted index. Subsequently, documents common to the retrieved at least one terms inverted list and to the retrieved language inverted lists are identified so that provision of data characterizing the identified documents can be initiated.

The initiating can include one or more of transmitting at least a portion of the data characterizing the identified documents (where such data identifies a location of the identified documents), persisting at least a portion of the data characterizing the identified documents, and displaying at least a portion of the data characterizing the identified documents.

The language inverted index can be a positional inverted index that specifies word position ranges that contain a specific language. The parsed terms can comprise stems of words and the terms inverted index can map stems to linguistic variants of such stems. A stem can includes variants in multiple languages so that the terms inverted index group variants of a particular stem according to languages. Term frequencies can be ranked based on lengths of the inverted lists retrieved from the terms inverted positional index. Such ranked inverted lists can be searched according to the ranking. The identified documents can be identified according to the ranking.

In an interrelated aspect, a search query of a collection of electronic documents to identify one or more terms is parsed. The identified terms can be associated with two or more languages. At least one terms inverted list corresponding to at least one identified term is retrieved from a terms positional inverted index. The terms positional inverted index includes a first plurality of inverted lists mapping terms and associated document positions to documents within the collection of electronic documents. At least one language inverted list corresponding to each associated language is retrieved from a language inverted index. The language index includes a second plurality of inverted lists mapping languages to documents within the collection of electronic documents. The language inverted index is separate and distinct from the terms positional inverted index and stores different language variants of the same document within corresponding subcells (with each subcell having a defined language). Documents common to the retrieved at least one terms inverted list and to the retrieved language inverted lists can be identified so that provision of data characterizing the identified documents can be initiated.

Articles of manufacture are also described that comprise computer executable instructions permanently stored on computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein. In addition, for computer-implemented methods the recited operations can be implemented by one or more data processors (which may be part of a single computing system or distributed amongst different computing systems).

The subject matter described herein provides many advantages. For example, the current subject matter obviates the need to consume large amounts of storage capacity that is required when inverted indexes are provided for each individual language. In addition, language-independent queries are more rapidly handled because they are no longer distributed among numerous inverted indexes corresponding to each language. Furthermore, the current subject matter is advantageous in that it allows for multi-language documents to be more effectively indexed.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
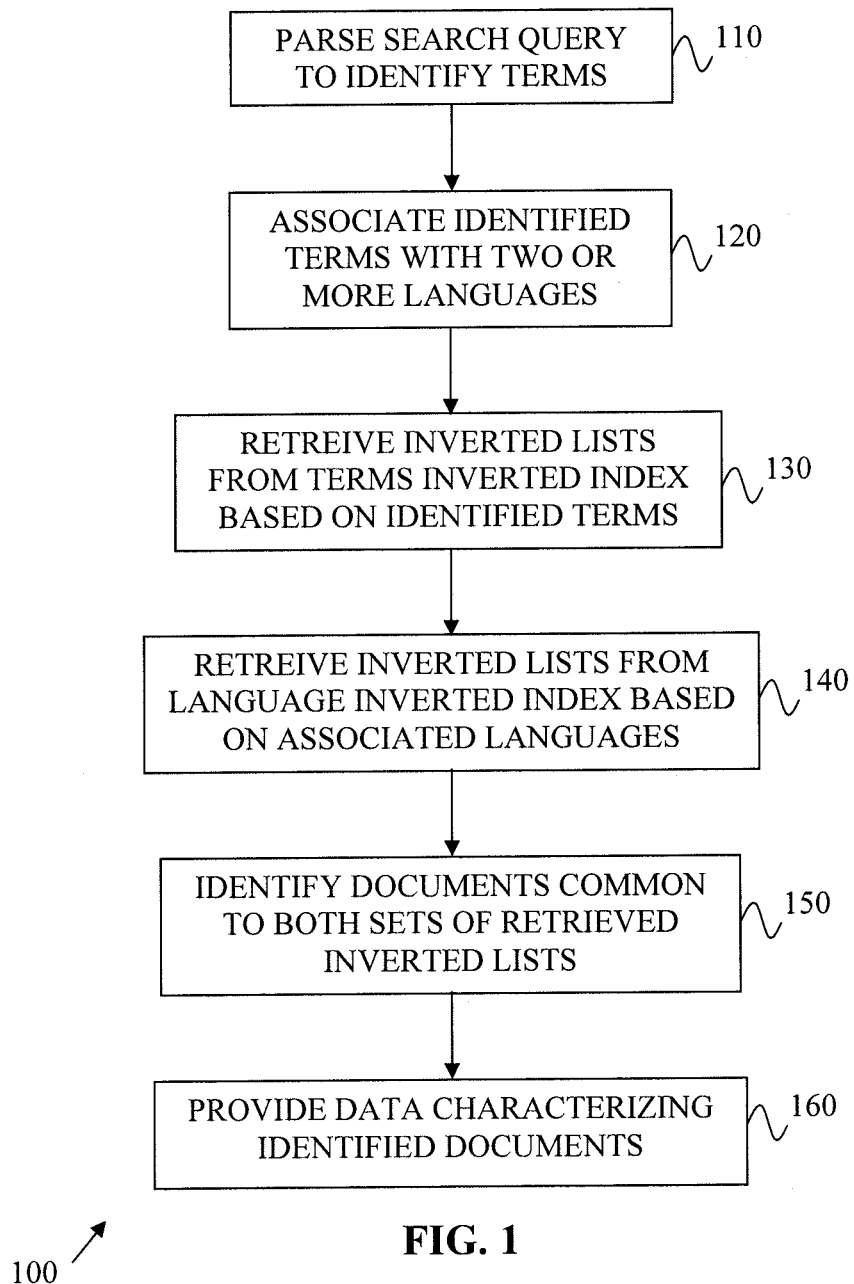
FIG. 1 is a process flow diagram illustrating retrieval of documents using search queries including terms in multiple languages.

FIG. 1 is a diagram 100 illustrating a method in which, at 110, a search query for a collection of electronic documents is parsed to identify one or more terms. Thereafter, at 120, the identified terms are associated with two or more languages (i.e., spoken languages such as English, German, Spanish, etc.). It will also be appreciated that queries can be performed with only a single language. At least one terms inverted list is retrieved, at 130, from a terms inverted index (e.g., a positional inverted index, a non-positional inverted index, etc.) that comprises a first plurality of inverted lists mapping terms and associated document positions to documents within the collection of electronic documents. At least one language inverted list corresponding to each associated language is retrieved, at 140, from a language inverted index that comprises a second plurality of inverted lists mapping languages to documents within the collection of electronic documents.

The language inverted index is separate and distinct from the terms inverted index and the inverted lists can be retrieved in any sequence and/or in parallel. Once the inverted lists are retrieved, at 150, documents common to the retrieved at least one terms inverted list and to the retrieved language inverted lists are identified. Once this identification has been made, at 160, provision of data characterizing the identified documents can be initiated.

Figure 2:
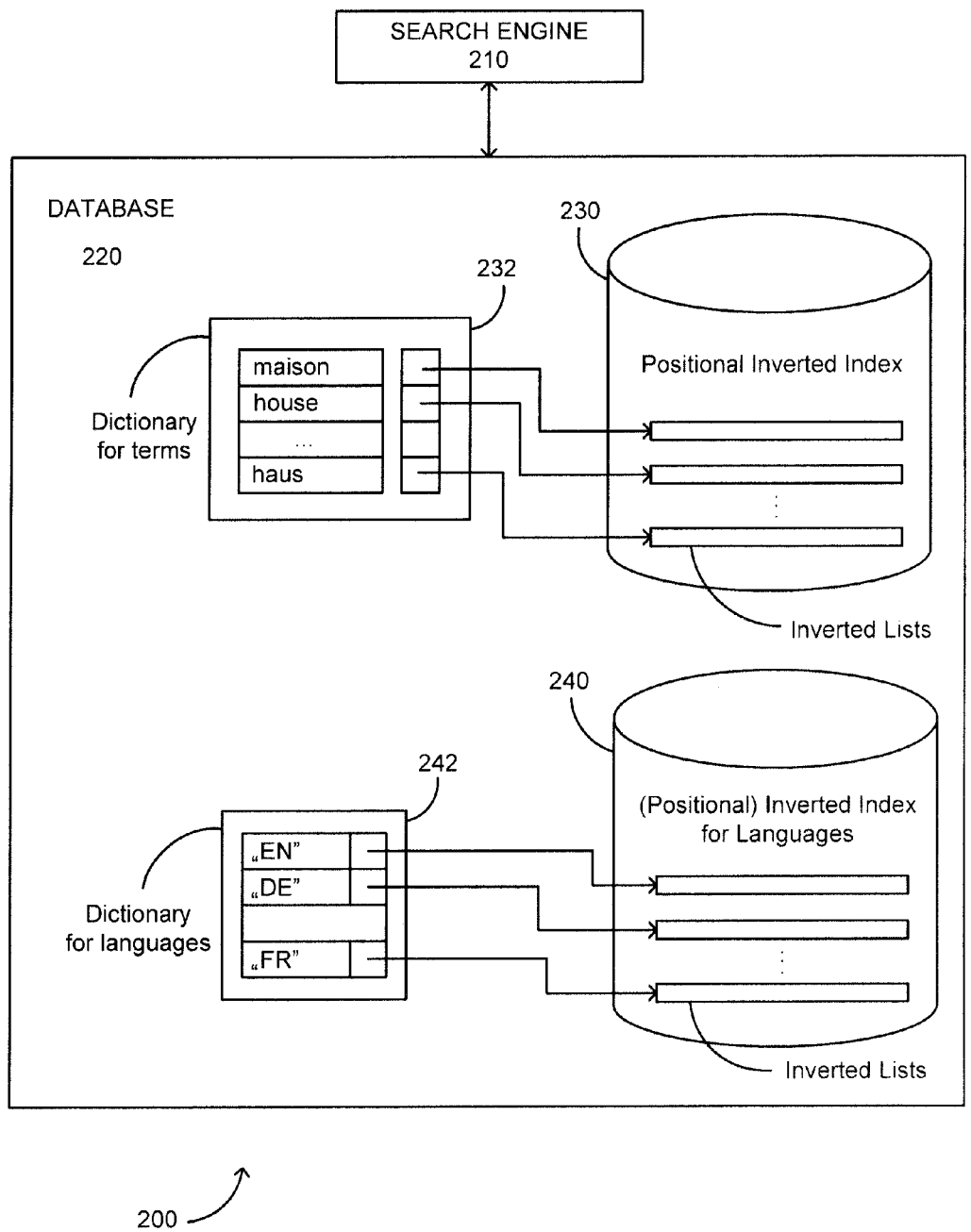
FIG. 2 is a diagram illustrating a search engine and a database having first and second inverted indexes.

FIG. 2 is a diagram 200 illustrating a search engine 210 which can poll a database 220 for documents responsive to a query. While the search engine 210 is illustrated as a separate module, the search engine 210 can include one or more or all of the components included in FIG. 2. The database 220 includes a first inverted index 230 and a second inverted index 240 both of which are used to identify documents stored within the database that are responsive to a query. The first inverted index 230 is a positional inverted index for terms and a corresponding first plurality of inverted lists 232 which map terms to documents within the database 220 and additionally identifies or characterizes positions of such terms within the documents. The second inverted index 240 is a languages positional inverted index that identifies languages utilized by documents and a corresponding second plurality of inverted lists 242 that map languages to documents within the database 220. The second inverted index 240, in some implementations can also store positional information (e.g., exact positions, ranges of positions, etc.) of the languages as used within the documents.

The inverted lists 232, 242 can be organized and configured in various manners to facilitate efficient searching of the inverted indexes 230, 240. For example, a long inverted list can be supplemented with a short list of pointers to places in the long list to avoid having to read the entire long list up to a given point of interest. The short list of pointers can be optimized depending on a variety of factors including systems resources, types of indexed documents, and the like.

The term database as used herein refers to a collection of one or more documents which in this context means a set of electronic data (both electronic data stored in a file and electric data received over a network). A document does not necessarily correspond to a file. A document can be stored in a portion of a file that holds other documents, in a single file dedicated to the document in question, or in a set of coordinated files. The documents may be text documents and/or other types of electronic documents including audio, video, picture ADOBE FLASH media files, and other forms of media. For example, a video file may have an associated description (e.g., the description may form part of the metadata/attributes of the video file, etc.) that may be indexed and the video may be presented to the user as a search result.

The search engine 210 when evaluating a query traverses the first plurality of inverted lists 232 for each index term included in the query as well as the second plurality of inverted lists 242 for each language implicated by the query (i.e., the query terms are each associated with a language). For example, evaluating a query formed using Boolean logic may require traversing more than one inverted list depending on the operator, such as OR (the union of term inverted lists), AND (an intersection of term inverted lists), and the like, or a proximity operator (an intersection of term inverted lists), as well as languages as described below. Evaluating a phrase query can be achieved by combining the inverted lists (provided that they are positional inverted lists for matching the positions of the query phase) for the query terms to identify matching documents. In addition, term languages can also be verified (depending on the language granularity).

As stated above, the first inverted index 230 is a word-based positional inverted index that contains a dictionary of terms. The second inverted index 240 (which is separate and distinct from the first inverted index 230) is an inverted index that indexes languages of documents in the database 220 (and, in some implementations, it can also store positional information of such languages within the associated documents).

The following provides various techniques which can be implemented using the first and second inverted indexes 230, 240.

Language-independent searching. In cases in which the user or the system specifies that results in all languages are requested, there is no need to access the second inverted index 240. Accordingly, with such queries, only the first inverted index 230 is accessed to retrieve inverted lists 232 containing the terms in the queries. Thereafter, documents containing each term as identified by the retrieved inverted lists 232 are identified and data characterizing the identified documents can be provided (e.g., displayed, transmitted, persisted, etc.). In some implementations, optimizations/relevancy determinations can be applied to the documents responsive to the query.

Language-specific searching: With a language-specific search approach, terms within a query are identified as well as corresponding languages (or in some cases two or more languages if such terms are found within more than one language). Thereafter, a search (e.g., a phrase search that specifies the exact terms and their relative positions, etc.) is conducted on the first inverted index 230 and a search of documents containing the corresponding languages is conducted on the second inverted index 240. This can be accomplished, for example, by adding the language as part of an AND-term to the query (if the language inverted lists are of document granularity; otherwise, term positions also need to be checked). The results from both of the inverted indexes 230, 240 are then merged to identify common hits which are then mapped to associated documents. Data characterizing such documents can be then be provided (e.g., displayed, transmitted, persisted, etc.).

Language versions of a single document: In some cases, there may be multiple versions of as single document in each of a plurality of different languages. In databases using a multi-value approach (e.g., an insert-only database, etc.), the second inverted index 240 can hold versions of documents in different languages by adding language variants of the document into the same multi-value using different languages (for example, by using an additional column). Multi-value approach in this context, refers to a database implementation in which it is possible to split cells in a variable number of subcells (still in the same column). In this case, the inverted index can store subcell-precise document IDs and different language variants of the same document can be stored in corresponding subcells. In addition, the language for each subcell can be defined in the language inverted index.

Multi-language documents: If a document contains multiple languages, it can be added to each of the corresponding multiple inverted lists 242 in the second inverted index 240. Alternatively, in some implementations, there are entries in the multiple inverted lists 242 that correspond to pre-defined language combinations (e.g., English-German, English-Spanish, etc.). In addition, in some implementations, for word-precise language-specific queries, positional information can be added to the inverted lists 242 of the second inverted index 240 (i.e., the second inverted index 240 can be a positional inverted index). For example, the word position ranges that contain the specific language can be characterized in the inverted lists 242.

Language-specific term frequency: The frequency of terms in specific languages can be used for ranking purposes (i.e., ordering of responsive documents, ordering of entries in inverted lists, etc.). In addition, language-independent frequencies can be estimated by the lengths of the terms inverted lists 232 (which may be compressed). Language-specific frequencies can be calculated by intersecting the matching the language inverted lists 242 with the matching terms inverted lists 232. Such an arrangement can be accelerated using random sampling in which IDs are randomly selected from the language list and the term list, and then, such samples are intersected. Depending on the sample size, the result size of intersecting the complete lists can be estimated.

Linguistic searching: Linguistic searching can be enabled by mapping stems (i.e., a portion of a word that is common to all of its inflected variants, etc.) to their variants within the terms inverted lists 232. As such stems are language specific, a multi-language terms inverted index 230 can store which variant is valid for which language.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A computer implemented method comprising:
   parsing a search query of a collection of electronic documents to identify two or more terms in two or more languages;
   associating the identified two or more terms with the two or more languages;
   retrieving, from a terms inverted index, at least one terms inverted list corresponding to at least one identified term, the terms inverted index comprising a first plurality of inverted lists mapping terms and associated document positions to documents within the collection of electronic documents;
   retrieving, from a language inverted index, at least one language inverted list corresponding to each associated language, the language index comprising a second plurality of inverted lists mapping languages to documents within the collection of electronic documents, the language inverted index being separate from the terms inverted index;
   identifying documents common to the retrieved at least one terms inverted list and to the retrieved language inverted lists; and
   initiating provision of data characterizing the identified documents.

2. A method as in claim 1, wherein the initiating comprises: transmitting at least a portion of the data characterizing the identified documents, wherein the data identifies a location of the identified documents.

3. A method as in claim 1, wherein the initiating comprises: persisting at least a portion of the data characterizing the identified documents.

4. A method as in claim 1, wherein the initiating comprises: displaying at least a portion of the data characterizing the identified documents.

5. A method as in claim 1, wherein the language inverted index is a positional inverted index that specifies word position ranges that contain a specific language.

6. A method as in claim 1, wherein the parsed terms comprise stems of words and the terms inverted index maps stems to linguistic variants of such stems.

7. A method as in claim 6, wherein a stem includes variants in multiple languages, and wherein these terms inverted index group variants of a particular stem according to languages.

8. A method as in claim 1, further comprising: ranking term frequencies based on lengths of the inverted lists retrieved from the terms inverted index.

9. A method as in claim 8, wherein the ranked inverted lists are searched according to the ranking.

10. A method as in claim 8, wherein the identified documents are identified according to the ranking.

11. An article of manufacture comprising:
computer executable instructions non-transitorily stored on computer readable media, which, when executed by a computer, causes the computer to perform operations comprising:
  parsing a search query of a collection of electronic documents to identify two or more terms in two or more languages;
  associating the identified two or more terms with the two or more languages;
  retrieving, from a terms positional inverted index, at least one terms inverted list corresponding to at least one identified term, the terms positional inverted index comprising a first plurality of inverted lists mapping terms and associated document positions to documents within the collection of electronic documents;
  retrieving, from a language inverted index, at least one language inverted list corresponding to each associated language, the language index comprising a second plurality of inverted lists mapping languages to documents within the collection of electronic documents, the language inverted index being separate from the terms positional inverted index;
  identifying documents common to the retrieved at least one terms inverted list and to the retrieved language inverted lists; and
  initiating provision of data characterizing the identified documents.

12. An article as in claim 11, wherein the initiating comprises:
  transmitting at least a portion of the data characterizing the identified documents, wherein the data identifies a location of the identified documents.

13. An article as in claim 11, wherein the initiating comprises:
  persisting at least a portion of the data characterizing the identified documents.

14. An article as in claim 11, wherein the initiating comprises:
  displaying at least a portion of the data characterizing the identified documents.

15. An article as in claim 11, wherein the language inverted index is a positional inverted index that specifies word position ranges that contain a specific language.

16. An article as in claim 11, wherein the parsed terms comprise stems of words and the terms inverted index maps stems to linguistic variants of such stems.

17. An article as in claim 16, wherein a stem includes variants in multiple languages, and wherein these terms inverted index group variants of a particular stem according to languages.

18. An article as in claim 11, wherein the operations further comprise:
  ranking term frequencies based on lengths of the inverted lists retrieved from the terms inverted positional index.

19. An article as in claim 18, wherein the ranked inverted lists are searched according to the ranking and wherein the identified documents are identified according to the ranking.

20. A computer implemented method comprising:
  parsing a search query of a collection of electronic documents to identify two or more terms in two or more languages;
  associating the identified two or more terms with the two or more languages;
  retrieving, from a terms positional inverted index, at least one terms inverted list corresponding to at least one identified term, the terms positional inverted index comprising a first plurality of inverted lists mapping terms and associated document positions to documents within the collection of electronic documents;
  retrieving, from a language inverted index, at least one language inverted list corresponding to each associated language, the language index comprising a second plurality of inverted lists mapping languages to documents within the collection of electronic documents, the language inverted index being separate from the terms positional inverted index and storing different language variants of the same document within corresponding subcells, each subcell having a defined language;
  identifying documents common to the retrieved at least one terms inverted list and to the retrieved language inverted lists; and
  initiating provision of data characterizing the identified documents.

21. A system comprising:
at least one programmable processor; and
a machine-readable medium storing instructions that, when executed by the at least one programmable processor, cause the at least one programmable processor to perform operations comprising:
  parsing a search query of a collection of electronic documents to identify two or more terms in two or more languages;
  associating the identified two or more terms with the two or more languages;
  retrieving, from a terms inverted index, at least one terms inverted list corresponding to at least one identified term, the terms inverted index comprising a first plurality of inverted lists mapping terms and associated document positions to documents within the collection of electronic documents;
  retrieving, from a language inverted index, at least one language inverted list corresponding to each associated language, the language index comprising a second plurality of inverted lists mapping languages to documents within the collection of electronic documents, the language inverted index being separate from the terms inverted index;
  identifying documents common to the retrieved at least one terms inverted list and to the retrieved language inverted lists; and
  initiating provision of data characterizing the identified documents.

22. A system as in claim 21, wherein the initiating comprises: transmitting at least a portion of the data characterizing the identified documents, wherein the data identifies a location of the identified documents.

23. A system as in claim 21, wherein the initiating comprises: persisting at least a portion of the data characterizing the identified documents.

24. A system as in claim 21, wherein the initiating comprises: displaying at least a portion of the data characterizing the identified documents.

25. A system as in claim 21, wherein the language inverted index is a positional inverted index that specifies word position ranges that contain a specific language.

26. A system as in claim 21, wherein the parsed terms comprise stems of words and the terms inverted index maps stems to linguistic variants of such stems.

27. A system as in claim 26, wherein a stem includes variants in multiple languages, and wherein these terms inverted index group variants of a particular stem according to languages.

28. A system as in claim 21, wherein the operations further comprise ranking term frequencies based on lengths of the inverted lists retrieved from the terms inverted index.

29. A system as in claim 28, wherein the ranked inverted lists are searched according to the ranking.

30. A system as in claim 28, wherein the identified documents are identified according to the ranking.

31. A system comprising:
at least one programmable processor; and
a machine-readable medium storing instructions that, when executed by the at least one programmable processor, cause the at least one programmable processor to perform operations comprising:
parsing a search query of a collection of electronic documents to identify two or more terms in two or more languages;
associating the identified two or more terms with the two or more languages;
retrieving, from a terms positional inverted index, at least one terms inverted list corresponding to at least one identified term, the terms positional inverted index comprising a first plurality of inverted lists mapping terms and associated document positions to documents within the collection of electronic documents;
retrieving, from a language inverted index, at least one language inverted list corresponding to each associated language, the language index comprising a second plurality of inverted lists mapping languages to documents within the collection of electronic documents, the language inverted index being separate from the terms positional inverted index and storing different language variants of the same document within corresponding subcells, each subcell having a defined language;
identifying documents common to the retrieved at least one terms inverted list and to the retrieved language inverted lists; and
initiating provision of data characterizing the identified documents.

* * * * *